Jan. 6, 1970  A. J. BALON  3,488,069
SWIVEL TUBE COUPLING
Original Filed Oct. 22, 1965

INVENTOR.
ALBERT J. BALON
BY Bosworth, Sessions,
Herrstrom + Cain
ATTORNEYS

United States Patent Office 3,488,069
Patented Jan. 6, 1970

3,488,069
SWIVEL TUBE COUPLING
Albert J. Balon, 9717 Greenhaven Parkway,
Brecksville, Ohio 44141
Original application Oct. 22, 1965, Ser. No. 501,545.
Divided and this application Dec. 20, 1967, Ser.
No. 692,073
Int. Cl. F16l 21/00, 7/00, 9/00, 11/00
U.S. Cl. 285—94           5 Claims

ABSTRACT OF THE DISCLOSURE

A connector and tube assembly including a fitting with a bore, a tube in said bore and having a close sliding fit therewith, a flange on said fitting and extending in spaced parallel relation with the tube and being bent into biting engagement with the tube, and a sealant between the tube and the flange, with the engagement between tube and fitting providing for relative rotation therebetween.

CROSS REFERENCES TO RELATED APPLICATION

This application is a division of applicant's copending application Ser. No. 501,545, filed Oct. 22, 1965.

BACKGROUND OF THE INVENTION

This invention relates to gas stoves and more particularly to a new and improved gas stove valve and tube assembly for pilot lights and the like.

SUMMARY OF THE INVENTION

It is a general object of this invention to provide a new and improved connector and tube assembly for gas stoves, and the like, obtaining unobvious and unexpected benefits and advantages over prior assemblies.

Another object of this invention is to provide a new and improved connector and tube assembly for gas stoves, and the like, including a new and improved assembly in which the connector or fitting and tube are joined together in a gastight joint and can be rotated relative to each other.

Still other objects of this invention include the provision of a new and improved connector and tube assembly having a gastight joint providing relative rotation therebetween which is easily and economically manufactured and used; which is suitable for use in ordinary domestic cooking stoves and the like; which is effective and efficient in operation; which is simple and foolproof in operation; which is stable at relatively high temperatures; which complies with accepted safety standards and codes for both installation and use, including installation and use in domestic and houshold environments; and which permits turning and adjustment of the fitting or connector without adverse or deleterious effects on the tube and the joint itself.

Still another object of this invention is to provide a new and improved connector and tube assembly for gas stoves, and the like, obtaining one or more of the objects and advantages set forth above.

These and other objects and advantages of this invention will appear from the following description of preferred forms thereof; reference being had to the accompanying drawings.

DESCRIPTION OF THE PREFERRED EMBODIMENTS

This invention is useful in gas cooking stoves, and the like, and comprises a new and improved valve and tube assembly for a gas pilot light, and the like, including a new and improved valve and connector and a new and improved pilot housing and mounting structure.

Figure 1:
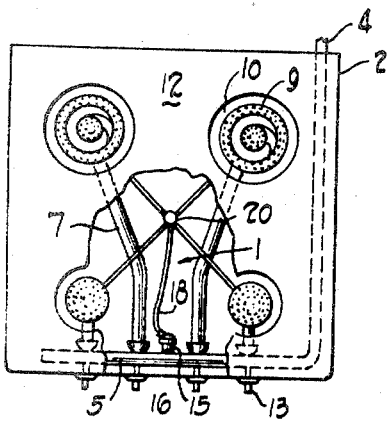
FIGURE 1 is a plan view, partly broken away, of a stove having a tube and valve assembly embodying a preferred form of this invention.

A valve and tube assembly, indicated generally at 1, FIGURE 1, embodying this invention is shown, by way of example, in use on a conventional gas stove 2, having a gas supply line 4 terminating in a conventional manifold 5 from which a plurality of branch, feed or supply lines 7 lead to the respective burners 9, which are situated in openings 10 in stove top 12. Lines 7 are controlled, respectively, by valves 13. When a valve 13 is opened and the gas flows to the respective burner 9, the same is lighted by a pilot light which is also supplied from manifold 5 via a combination filter and distributor 15. Filter 15 is provided with a single threaded inlet 16 (FIGURE 3) for connection with manifold 5 and a number of tapped sockets or outlets 17 (FIGURE 4) equal to the number of pilot lights to be supplied therefrom. The entire pilot light apparatus including distributor, tube or pipe, pilot light member and housing is conventionally known as the harness.

All of the above is old and, per se, forms no part of the present invention.

Figure 2:
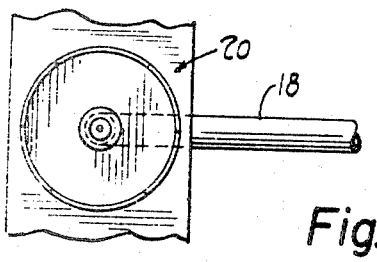
FIGURE 2 is a plan view, on an enlarged scale, of the pilot housing and mounting embodying this invention.

Valve and tube assembly 1 includes a small tube or pipe 18 (FIGURES 2 and 3) formed of suitable material, such as aluminum, and providing a gas conduit between the filter 15 and the pilot light, indicated generally at 20, embodying this invention.

In order to obtain the objects and advantages of this invention and provide a simple, effective, efficient and low cost pilot light 20, tube 18 is provided, at its outer end 21, with external threads 22 and, just inwardly thereof, with an external shoulder 24. Shoulder 24 is adapted to function as a stop for positioning and mounting or supporting the pilot light on the stove. Accordingly, end 21 of tube 18 extends through an aperture 25 in a support bar 26, which is a part of the structure of stove 2. Aperture 25 has a diameter greater than the external diameter of threads 22 but less than external diameter of stop or shoulder 24. Thus end 21 can only enter into aperture 25 until support 26 seats on shoulder 24. End 21 and threads 22 extend outwardly from shoulder 24 and above support 26 sufficiently so that threads 22 may be engaged and tightened upon above the support.

Shoulder 24 is formed integrally with and as a unitary part of tube 18, just inwardly of threads 22, by swaging, or other suitable means.

The pilot burns at one or more small orifices 28 provided at the end 21 of tube 18. The flame is protected, the pilot light mounting completed and the pilot light held in place by means of a pilot light housing 30. Housing 30 is conveniently shaped and formed from a single piece of sheet metal to provide a cup-like member having bottom 31 and side wall 32. Bottom 31 is of greater external diameter than aperture 25 and has a central aperture 34 surrounded by an internally extending wall or sleeve 35 having threads 36 which are complimentary to and engage threads 22 so that housing 30 may be tightened upon threads 22 and against support 26 to mount and hold the pilot light in position.

End 21 of tube 18 preferably extends, as shown, above threads 22 a short distance so as to position the flame higher within housing 30 and housing 30 is preferably provided with apertures or inlets 37 in wall 32 so that air may flow into the housing from below the level of the flame to provide a proper oxygen supply therefor.

Thus this invention provides a simple, efficient and economical pilot light, housing and mounting for valve and tube assemblies for stoves, and the like, comprising only a tube and the pilot housing member and obviating the need for separate washers, nuts or other members.

As noted above, valve and tube assembly 1 also includes a new and improved valve and coupling for coupling the pilot light tube to the filter 15 and controlling the flow of gas from the manifold to the pilot light.

The valve embodying a preferred form of this invention comprises a single fitting 40 extending axially from the end of tube 18 and obviating the need for a separate coupling and valve mechanism while providing a wide range of easily adjusted flow control, including stoppage of all flow, without leakage or similar danger. Further, fitting 40 in the preferred embodiment of this invention, also, provides for relative rotational movement between the tube 18 and the filter 15, thereby providing both swiveling or rotation of the pilot light relative to the filter and adjustment of the valve with attendant rotation of the fitting 40 relative to the tube 18 without otherwise disturbing the completed assembly, introducing gas leaks or interfering with the pilot light, and the valve and tube assembly, its mounting on the stove connection with the manifold and/or its function.

Figure 4:
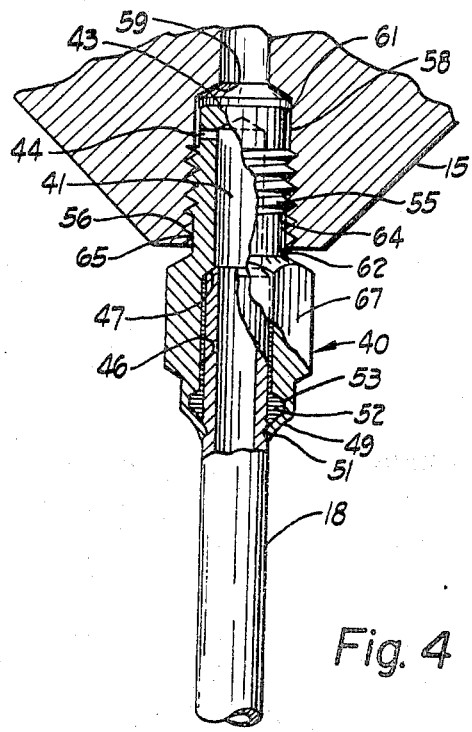

More particularly, as best seen in FIGURE 4, fitting 40 is of generally cylindrical shape with a hollow interior 41 which is in direct communication with the interior of tube 18. Interior 41 is closed at its outer or valve end by wall 43 and a lateral passageway or bore 44, provides an inlet to interior 41.

In order to rotatably mount fitting 40 on tube 18, the interior 41 is counterbored as at 46 to provide an interior diameter having a sliding fit with the exterior of tube 18 and a seat 47 against which the tip of the tube seats when the fitting and tube are assembled.

In addition, fitting 40 is formed with an axially extending flange or lip 49, having a greater internal diameter than counterbore 46 and length sufficient so that the lip can be deformed, as by spinning, into biting and sealing engagement with tube 18, as shown at 51. Engagement 51 is circumferential and not only prevents disengagement of the tube and fitting but also provides for swiveling or relative rotation between the fitting 40 and tube 18 to and for the purposes set forth above.

The engagement 51 is affected, on the one hand, because fitting 40 is harder than tube 18 and is rendered more effective, on the other hand, by first coating tube 18 with a sealant 52, such as a grease remaining stable up to 750° F. Tube 18 is coated with sealant 52 before fitting 40 is slipped over the end, and, as the tube is spun to effect the swivel joint by forcing lip 49 into tube 18 with a suitable tool, the sealant in part remains between the fitting and tube along the meeting cylindrical portions thereof, i.e., along counterbore 46 and in part collects in and packs and seals in the relief 53, immediately adjacent the engagement 51.

The connection between fitting 40 and tube 18 is, thus, leakproof and rotatable, and although unobvious, obtains the other objects and advantages of this invention in this respect.

In order to connect the tube 18 with the filter 15 in an adjustable, sealing engagement, fitting 40 is provided with external threads 55, spaced slightly from the end 43 of the fitting and adapted to have a loose fit with the internal threads 56 in the socket or bore 58 of the filter so that the fitting may be easily and readily engaged in and hand-tightened into the filter. The length of the fitting from end 43 to the end of threads 55 remote from end 43 is less than the depth of the bore 58 between the bore seat 59 and the outer end of the threads 56, so that the fitting is not seated at the completion of hand-tightening. In addition, seat 59 is tapered and end 43 of fitting 40 is provided with a non-complementary chamfer or radius 61 so that a line engagement is effected between the fitting 40 and the seat 59 when the fitting is fully seated and tightened into the filter.

The lateral bore 44 opens intermediate the end 43 and the threads 55 of fitting 40 so that the gas, under manifold pressure, may flow about end 43 and through bore 44 into the interior 41 of fitting 40 and thence through the tube 18 to the pilot light 20, when the valve is opened, but is stopped or turned off when the chamfer 61 engages seat 59.

In order to provide a gastight seal between the fitting 40 and filter 15, when the valve is opened and in order to facilitate the engagement and mounting of the fitting (valve) and pipe in the filter, threads 55 have a loose fit with threads 56 of the filter, so that the fitting can be positioned easily in the filter and then hand-tightened for the length of the threads 55 to complete the initial engagement. Further, threads 55 are held to a relatively few in number and immediately inwardly thereof, downwardly as viewed in FIGURE 4, fitting 40 is provided with a cylindrical body portion or shank 62, which has an external diameter slightly greater than the minimum internal diameter of the threads 56 on the filter.

Thus, the fitting is easily hand-tightened for the length of the threads 55—actually until the leading edge 64 of shank 62 engages the top of the first or outermost thread of threads 56 and so the fitting is easily mounted and engaged. Further, as noted above, the length of the fitting intermediate end 43 and the leading edge 64 of shank 62 is such, relative to the depth of the bore 58 in filter 15, that the end 43 and chamfer 61 of fitting 40 are spaced from seat 59 of the filter, when hand-tightened, a distance greater than the distance between chamfer and seat in the open position by enough to provide a sealing engagement between the lateral wall of shank 62 and the threads 56 in the manner of this invention, when assembly of the fitting therein is completed as set forth below.

The seal develops and forms as the fitting is turned further into the socket 58, after engagement between edge 64 and outermost thread 56, by conventional means, such as a wrench. The fitting, having a greater diameter, at shank 62 and being of harder material (brass vs. aluminum, for example) deforms and distorts the tips of threads 56, as shown in FIGURE 4, at 65, for example, so that a sealing engagement is formed as the fitting is tightened until fully seated with chamfer 61 in engagement with seat 59. Further, the seal 65 is such that the fitting may be backed off to open the valve, and the valve be adjusted, without loss of seal, so that gas flowing past the open valve is diverted through the aperture 44 and, into the interior 41 of fitting 40, as set forth above.

Further, the resistance to the entry of the fitting 40 into the socket 58, as shank 62 engages and deforms the threads 56, has the effect, as applicant understands it, of displacing the threads 55 of fitting 40 outwardly relative to the threads 56 of filter 15, because of the "drag" on or resistance to the fitting, as shank 62 enters into the socket 58 with the result that the threads 55 and 56 mate and engage tightly on the outwardly side of threads 55 and the inwardly side of threads 56. And, of course, the pressure of gas within the system and on the inlet side of the valve also tends to strenghen this seal since there is no pressure on the exit side of the valve, the pilot light orifice being in free and open communication with the atmosphere, at all times.

Fitting 40, as shown, also, has the advantage of having a flat end and a large circumferential engagement (between chamfer 61 and seat 59) when closed, with the result that opening of the valve provides fast "bleeding" of the gas through the "valve opening" around the end of the fitting and into the aperture 44, interior 41 of the fitting 40 and tube 18, so that tube 18 is cleared quickly of air (filled with gas) to provide for lighting of the pilot light markedly faster than with valves now commonly used for such purposes.

Figure 3:
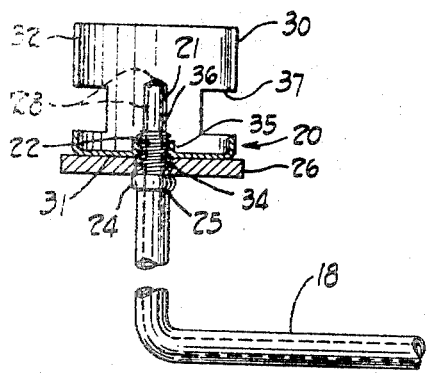
FIGURE 3 is a view, partly in elevation and partly in section, showing a tube and valve assembly embodying this invention; and, FIGURE 4 is an enlarged view, partly in elevation and partly in section, showing a valve embodying this invention.
Figure 3:
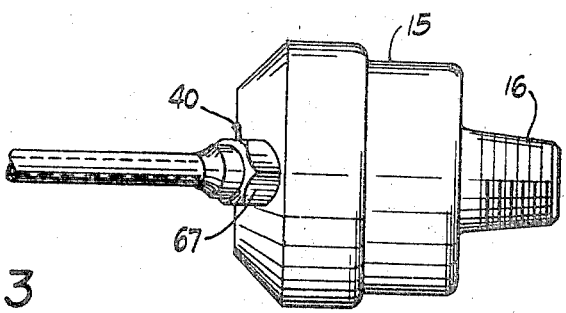

Fitting 40 is also conveniently provided with a hexagonal, as shown, or other non-circular, exterior body portion 65, FIGURES 3 and 4, in order to facilitate engagement of the fitting with a wrench, or the like, in order to tighten the same, and open and close the valve.

Further, while the valve and tube assembly of this invention has been descibed as a unit, it is to be understood that tubes and pilot housings, embodying this invention, may be used with other types and kinds of valves and coupling assemblies and that valves, embodying this invention, may be used with tubes having other pilot house structures and in other and different applications wherein valves obtaining the objects and advantages of this invention are or may be useful and advantageous.

Modifications and changes to the preferred forms of the invention disclosed herein may occur to those skilled in the art who come to understand the principles and precepts thereof. Accordingly, the scope of the patent to be issued hereon should not be limited to the forms of the invention herein specifically depicted and described but by the advance by which the invention has promoted the art.

I claim:

1. A connector and tube assembly having a rotatable, gastight joint therebetween and comprising a fitting having an open bore therein with a side wall, a tube having an end disposed in said bore and having a close, sliding fit with said side wall of said bore, said fitting including a circular flange extending axially along said tube and having a greater internal diameter than the external diameter of said tube, said flange being of harder material than said tube and being bent into biting and rotatable engagement with said tube and forming a relief adjacent said engagement with said tube between said tube and bent flange, and a soft semi-solid sealant disposed about said tube intermediate said tube and fitting and filling said relief, said fitting and tube being rotatable relative to each other.

2. The connector and tube assembly according to claim 1 in which said bore has a seat therein and said tube end is positioned against said seat.

3. The connector and tube assembly according to claim 1 in which aid sealant is a grease having stability at high temperatures.

4. A connector and tube assembly comprising a fitting having an open bore therein, said bore having a side wall and an internal seat, a tube having an end disposed in said bore and against said seat, said tube end having a close, sliding fit with said side wall of said bore, said fitting having a circular flange extending axially along said tube, said flange having a greater internal diameter than the external diameter of said tube, said flange being of harder material than said tube and being bent into biting engagement with said tube and forming a relief adjacent said engagement with said tube between said tube and flange, and a sealant comprising grease disposed about said tube intermediate said tube and fitting and filling said relief and extending within said bore, said fitting and tube being rotatable relative to each other.

5. The connector and tube assembly according to claim 4 in which said sealant is stable up to 750° F.

References Cited

UNITED STATES PATENTS

| 1,936,669 | 11/1933 | Heeter | 285—382 X |
| 2,175,752 | 10/1939 | Gray | 285—94 X |
| 2,514,417 | 7/1950 | Roofe | 285—94 X |
| 2,574,625 | 11/1951 | Coss | 285—382 X |
| 2,704,678 | 3/1955 | Klein et al. | 285—382 X |
| 2,751,767 | 6/1956 | Hedden | 285—382 X |
| 2,810,592 | 10/1957 | Williams | 285—94 X |
| 3,149,861 | 9/1964 | Larsson | 285—382.2 X |
| 3,288,496 | 11/1966 | Myers | 285—94 |

THOMAS F. CALLAGHAN, Primary Examiner

U.S. Cl. X.R.

29—432, 437, 458; 285—275, 382.2